US012711591B2

(12) United States Patent
Cui et al.

(10) Patent No.: US 12,711,591 B2
(45) Date of Patent: Aug. 18, 2026

(54) AUTOMATIC CABLE WIRE INSERTION VERIFICATION

(71) Applicant: The Boeing Company, Arlington, VA (US)

(72) Inventors: Michael Cui, Woodland Hills, CA (US); Darren Chan, Thousand Oaks, CA (US); Sachiko Matsumoto, San Diego, CA (US)

(73) Assignee: The Boeing Company, Arlington, VA (US)

( * ) Notice: Subject to any disclaimer, the term of this patent is extended or adjusted under 35 U.S.C. 154(b) by 251 days.

(21) Appl. No.: 18/437,005

(22) Filed: Feb. 8, 2024

(65) Prior Publication Data

US 2025/0259286 A1 Aug. 14, 2025

(51) Int. Cl.

| | |
|---|---|
| ***G06T 7/73*** | (2017.01) |
| ***G06T 7/00*** | (2017.01) |
| ***G06V 10/75*** | (2022.01) |
| ***G06V 10/764*** | (2022.01) |

(Continued)

(52) U.S. Cl.

CPC .............. *G06T 7/0002* (2013.01); *G06T 7/74* (2017.01); *G06V 10/751* (2022.01); *G06V 10/764* (2022.01); *G06V 10/82* (2022.01); *H01R 43/00* (2013.01); *G06T 2207/10012* (2013.01); *G06T 2207/20081* (2013.01); *G06T 2207/20084* (2013.01); *G06T 2207/20224* (2013.01)

(58) Field of Classification Search

None

See application file for complete search history.

(56) References Cited

U.S. PATENT DOCUMENTS

| | | | | |
|---|---|---|---|---|
| 10,288,410 | B2 | 5/2019 | Hoffman | |
| 2021/0049754 | A1* | 2/2021 | Ortega | B25J 9/163 |
| 2021/0399470 | A1* | 12/2021 | Hoffmann | G06T 7/70 |

(Continued)

FOREIGN PATENT DOCUMENTS

| | | | |
|---|---|---|---|
| CN | 211888013 | U | 11/2020 |
| CN | 114006237 | A | 2/2022 |

(Continued)

OTHER PUBLICATIONS

De Gregorio, D. et al., "Integration of Robotic Vision and Tactile Sensing for Wire-Terminal Insertion Tasks," IEEE Transactions on Automation Science and Engineering, vol. 16, No. 2, Jun. 25, 2018, 15 pages.

Muja, M. et al., "FLANN—Fast Library for Approximate Nearest Neighbors User Manual," Computer Science Department, University of British Columbia, Nov. 26, 2009, 21 pages.

(Continued)

*Primary Examiner* — David Ometz

(74) *Attorney, Agent, or Firm* — Alleman Hall LLP

(57) ABSTRACT

A method for cable wire insertion verification includes receiving, from a camera system, an inspection image of a connector housing held in a housing retainer of a housing inspection system. Via a connector recognition machine vision system, the connector housing is classified as a recognized connector housing type based, at least in part, on a comparison between the inspection image of the connector housing and a template image corresponding to the recognized connector housing type. For one or more cable cavities of the connector housing, the method includes automatically verifying whether a correct cable wire is inserted into the cable cavity according to the recognized connector housing type.

20 Claims, 9 Drawing Sheets

(51) Int. Cl.

| | |
|---|---|
| ***G06V 10/82*** | (2022.01) |
| ***H01R 43/00*** | (2006.01) |

(56) References Cited

U.S. PATENT DOCUMENTS

| | | | | |
|---|---|---|---|---|
| 2022/0254055 | A1* | 8/2022 | Sohmshetty | G06T 7/13 |
| 2023/0344186 | A1* | 10/2023 | Cui | H01R 43/20 |

FOREIGN PATENT DOCUMENTS

| | | | | | |
|---|---|---|---|---|---|
| CN | 115994895 | A | | 4/2023 | |
| CN | 117372435 | A | * | 1/2024 | G06T 7/0004 |
| CN | 117372769 | A | * | 1/2024 | G06V 10/764 |
| KR | 102191704 | B1 | * | 12/2020 | G01N 21/95 |
| KR | 20220147911 | A | * | 11/2022 | G06V 10/469 |

OTHER PUBLICATIONS

Lukežič, A. et al., "Discriminative Correlation Filter with Channel and Spatial Reliability," Proceedings of the IEEE Conference on Computer Vision and Pattern Recognition, Jul. 21, 2017, Honolulu, HI, 10 pages.

Hearst, M. et al., "Support vector machines," IEEE Intelligent Systems, vol. 13, No. 4, Jul. 1998, 12 pages.

Lindeberg, T., "Scale Invariant Feature Transform," Scholarpedia, Available Online at scholarpedia.org/article/Scale_Invariant_Feature_Transform, Available as Early as Jan. 11, 2012, 18 pages.

Agarwal, A. et al, "A survey of planar homography estimation techniques," Centre for Visual Information Technology, Tech. Rep. IIIT/TR/2005/12, 2005, 25 pages.

European Patent Office, Extended European Search Report Issued in Application No. 24218277.2, Jun. 6, 2025, 9 pages.

* cited by examiner

200

RECEIVE AN INSPECTION IMAGE OF A CONNECTOR HOUSING HELD IN A HOUSING RETAINER
202

CLASSIFY THE CONNECTOR HOUSING AS A RECOGNIZED CONNECTOR HOUSING TYPE BASED, AT LEAST IN PART, ON A COMPARISON BETWEEN THE INSPECTION IMAGE AND A TEMPLATE IMAGE
204

FOR ONE OR MORE CABLE CAVITIES OF THE CONNECTOR HOUSING, AUTOMATICALLY VERIFY WHETHER A CORRECT CABLE WIRE IS INSERTED INTO THE CABLE CAVITY
206

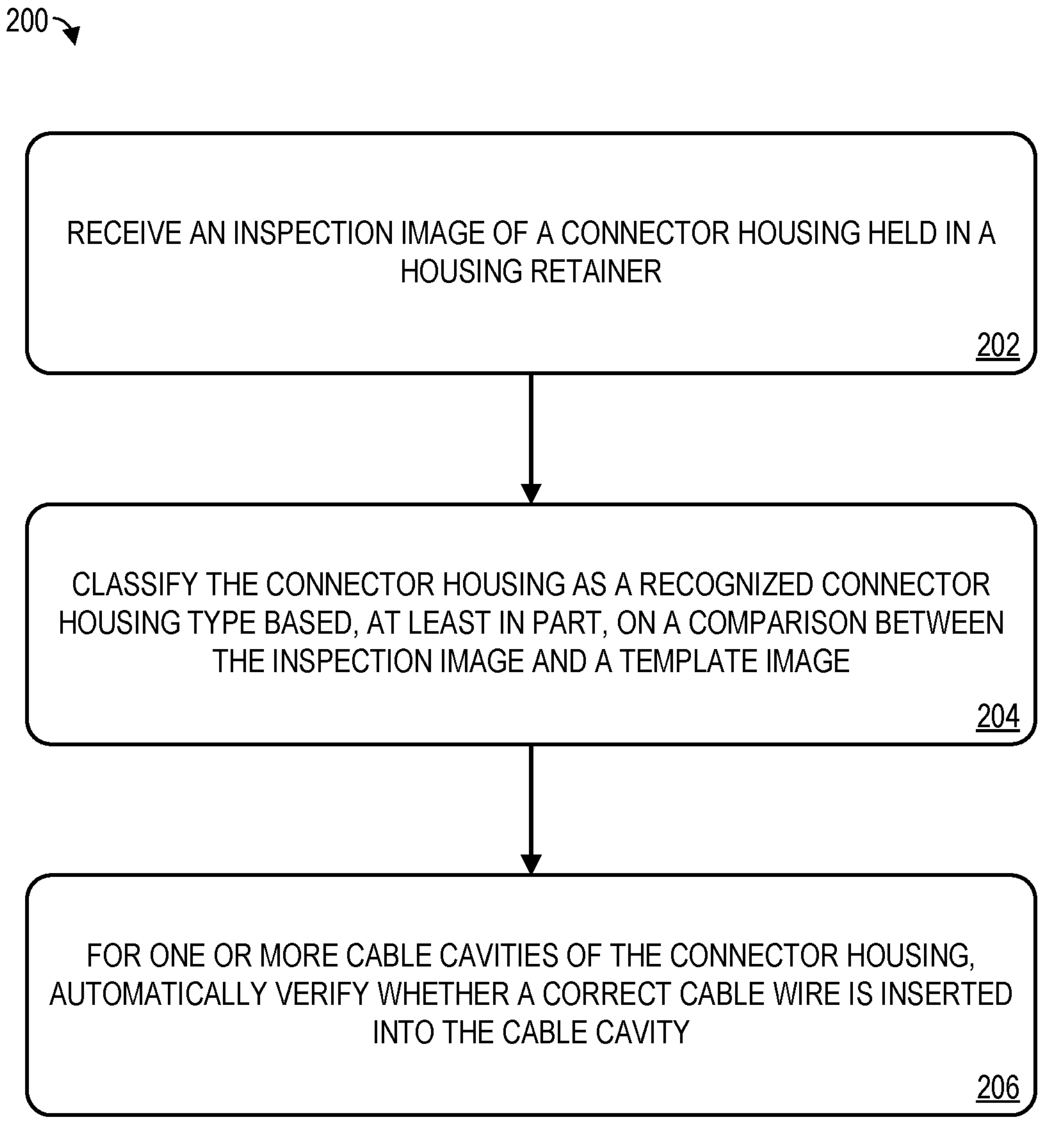

FIG. 2

AUTOMATIC CABLE WIRE INSERTION VERIFICATION

FIELD

The invention relates generally to computer vision systems, and more particularly, to automatic verification of cable wire insertion into a connector housing.

BACKGROUND

Various types of cable connectors are often used to conductively couple one cable to another, and/or couple a cable to an electronic device, for transmission of data and/or power. In some examples, such cable connectors include one or more cable wires that are inserted into corresponding cable cavities of a connector housing. The size and shape of the connector housing, as well as the number and distribution of cable cavities included in the connector housing, can vary from one scenario to another depending on the purpose of the cable connector.

SUMMARY

This summary is not an extensive overview of the specification. It is intended to neither identify key or critical elements of the specification nor delineate any scope particular to embodiments of the specification, or any scope of the claims. Its sole purpose is to present some concepts of the specification in a simplified form as a prelude to the more detailed description that is presented in this disclosure.

A method for cable wire insertion verification includes receiving, from a camera system, an inspection image of a connector housing held in a housing retainer of a housing inspection system. Via a connector recognition machine vision system, the connector housing is classified as a recognized connector housing type based at least in part on a comparison between the inspection image of the connector housing and a template image corresponding to the recognized connector housing type. For one or more cable cavities of the connector housing, the method includes automatically verifying whether a correct cable wire is inserted into the cable cavity according to the recognized connector housing type.

The features, functions, and advantages that have been discussed can be achieved independently in various embodiments or can be combined in yet other embodiments, further details of which can be seen with reference to the following description and drawings.

BRIEF DESCRIPTION OF THE DRAWINGS

FIG. 2 illustrates an example method for cable wire insertion verification.

DETAILED DESCRIPTION

Construction of a cable connector typically involves one or more steps in which individual cable wires are inserted into cable cavities of a connector housing. Such insertion may be done manually, such as by a human worker, and/or automatically, such as via suitable mechanical or robotic insertion systems. In either case, however, cable wire insertion can be inconsistent and error prone. Furthermore, manual inspection of connector housings during manufacturing can be tedious and time-consuming and may not always detect cable insertion errors.

Accordingly, the present disclosure is directed to techniques for automatic cable wire insertion verification. The techniques described herein include capturing an inspection image of a connector housing held in a housing retainer of a housing inspection system. This may be done to classify the connector housing as a recognized connector housing type. For instance, different connector housings may have different shapes, sizes, distributions of cable cavities, etc. Thus, by first recognizing the type of connector housing under inspection, the system can confirm that the correct type of connector housing was inserted into the housing inspection system, and then evaluate whether cable wires are inserted into correct cable cavities during a subsequent cable insertion sequence. In this manner, the housing inspection system may detect cases where insertion errors occur, such as insertion of a cable wire into the incorrect cable cavity, and/or insertion of the cable wire by an incorrect insertion distance. This can beneficially improve the speed and accuracy with which cable connectors are constructed, and beneficially reduce human manual effort involved in such construction.

Figure 1:
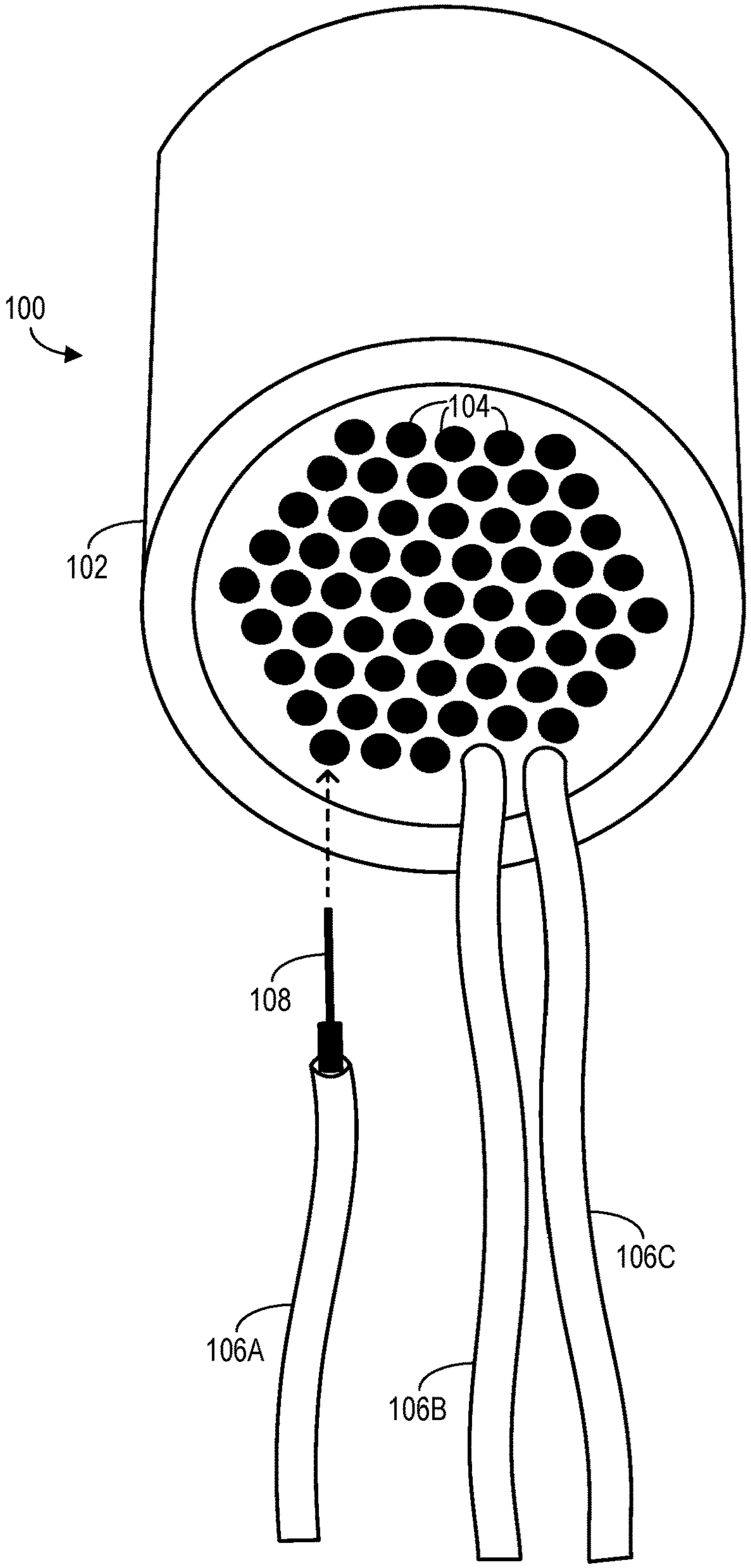
FIG. 1 schematically depicts an example cable connector, including a cable housing into which a plurality of cable wires is inserted.

Cable wire insertion into a connector housing is schematically illustrated with respect to FIG. 1, showing an example cable connector 100. The cable connector includes a connector housing 102, which includes a plurality of cable cavities into which cables can be inserted during assembly of the cable connector. Several cable cavities are labeled in FIG. 1 as cable cavities 104. Additionally, FIG. 1 depicts three different cable wires 106A, 106B, and 106C. Cable wires 106B and 106C have been inserted into respective cable cavities of the connector housing, while cable wire 106A has yet to be inserted.

It will be understood that the specific components shown in FIG. 1, as well as the other FIGS. 2-8 described herein, are highly simplified for the sake of explanation. The sizes, shapes, and specific appearances of the components shown in FIGS. 1-8 are non-limiting and not drawn to scale. Furthermore, it will be understood that the components depicted in FIGS. 1-8 may be constructed from any suitable materials. For example, the connector housings, housing retainers, cable wires, cable contacts, and other components described herein may be constructed from any suitable combination of plastics and/or metals, as non-limiting examples.

In the example of FIG. 1, three different cable wires are shown, although it will be understood that any suitable number of different cable wires may be inserted into a connector housing. For instance, the number of inserted cable wires may be equal to, or less than, the number of cable cavities in the connector housing. In other words, it will be understood that the specific configuration depicted in FIG. 1 is non-limiting, and that the techniques described herein may be applicable to cable connectors used to connect any suitable number of cable wires to one another, and/or to electronic devices such as PCBs.

The present disclosure primarily focuses on electrically conductive cable wires used to transmit electrical power and/or data. However, in some examples, the cable connectors described herein may be used with cable wires that are not electrically conductive, but include other suitable transmissive media, such as fiber optic cables.

As used herein, a "cable wire" includes a length of material used for transmission of data and/or power (e.g., copper wire, fiber optic), often coated with a protective material (e.g., plastic or rubber insulation, grounded shielding). In other words, the term "cable wire" may be used to refer to more than just the conductive (e.g., copper) or non-conductive (e.g., fiber optic) core of the cable, but may additionally refer to any coating, insulation, and/or shielding applied to the core.

A "cable" includes one or more different cable wires. In cases where a cable only includes one cable wire, then the terms "cable wire" and "cable" may be used interchangeably. However, in some examples, one cable includes two or more cable wires bundled together. For instance, in some embodiments, a cable is a multi-conductor cable including two or more cable wires—e.g., different conductive copper wires are each coated in their own respective insulated cable jackets, and also bundled together in additional insulation and/or shielding to form a multi-conductor cable. In some embodiments, a cable is a shielded twisted pair cable, in which different cable wires include pairs of conductors twisted together and protected by an insulating jacket. The twisted pairs are themselves bundled together and enclosed by additional shielding and/or insulation to form the shielded twisted pair cable. In cases where a cable includes two or more different cable wires, the different cable wires may each be inserted into different cable cavities of the connector housing.

In general, there will be a correspondence between different specific cable wires and the cable cavities into which the cable wires are inserted. For instance, different specific cable wires may have different purposes (e.g., to carry power, to carry data, to complete a ground connection), and thus may be inserted into different specific cable cavities, such that the final cable connector can be used to couple the cable wires with the correct downstream components (e.g., ground points, input/output lines, power inlets). In some cases, the different cable wires have different distinguishable appearances—e.g., the cable wires may have different sizes (e.g., gauges), may use different colors or types of insulating/protective jackets, may use different materials for the cable wire core (e.g., different conductive metals or non-conductive materials), and/or may differ in any other suitable way.

In the example of FIG. 1, a conductive cable contact 108 is attached to the tip of cable wire 106A. In general, however, tips of the cable wires may be treated in any suitable way. For instance, in some examples, conductive contacts may be attached to the cable wire tips, where such contacts may have any suitable size and shape. Different types of conductive contacts may in some cases be attached to different cable wires inserted into the same connector housing. In some examples, cable wires need not include conductive contacts. Rather, for instance, a cable wire may terminate with an exposed length of the cable wire core, or in any other suitable way.

Each cable cavity of the connector housing is sized and shaped for insertion of a cable wire. As shown, cable wires 106B and 106C are inserted into respective cable cavities of the connector housing. The cable cavities have any suitable size, based on the size of the cable intended for insertion into the cable cavities. In some examples, the same connector housing may include different cable cavity sizes intended for insertion of cable wires having different sizes (e.g., different wire gauges).

In some cases, the cable cavity is sized to accommodate the insulation jacket surrounding the core of the cable wire (e.g., the copper wire or fiber optic material), such that some length of insulated cable is inserted into the connector housing. In other examples, the insulation jacket may be trimmed such that only the cable core is inserted into the connector housing.

Any suitable length of cable wire may be inserted into the connector housing. In general, the cable wire is inserted sufficiently far into the connector housing so as to enable transmission of data and/or power between the cable wire and any components that are coupled with the connector housing—e.g., other cable wires and/or electronic devices. Additionally, or alternatively, cable wires may be inserted sufficiently far such that retention mechanisms within the connector housing hold the cable wires in place.

However, as discussed above, such insertion can in some cases be prone to insertion errors—e.g., cable wires being inserted into the incorrect cable cavities, and/or being inserted by an incorrect insertion distance. Manual inspection and verification of cable wire insertion can be tedious and time-consuming. Accordingly, FIG. 2 illustrates an example method 200 for automatic cable wire insertion verification. Steps of method 200 may be initiated, terminated, and/or repeated at any suitable time and in response to any suitable condition. Method 200 is primarily described as being performed by a housing inspection system, including a controller that executes software instructions to implement machine vision systems for housing recognition and insertion verification. However, it will be understood that steps of method 200 may be performed by any suitable computing system of one or more computing devices, and any computing device implementing steps of method 200 may have any suitable capabilities, hardware configuration, and form factor. In some examples, method 200 is implemented by computing system 800 described below with respect to FIG. 8.

At 202, method 200 includes receiving, from a camera system, an inspection image of a connector housing held in a housing retainer of a housing inspection system. An example housing inspection system is schematically illustrated with respect to FIG. 3A. Specifically, FIG. 3A includes a schematic representation of a housing inspection system 300, used to inspect a connector housing 302. The connector housing includes a plurality of cable cavities, several of which are labeled as cable cavities 304. During a subsequent insertion sequence, one or more cable wires may be inserted into corresponding cable cavities in the connector housing, as will be described in more detail below.

The connector housing is held in a housing retainer 306. In this example, the housing retainer includes two clamps that grip the sides of the connector housing, and thereby utilize friction to hold the connector housing in place. However, it will be understood that the housing retainer may take the form of any suitable mechanism or structure that holds the connector housing in place while automatic cable insertion verification occurs. For instance, the housing retainer may use friction, suction, magnetic attraction, adhesives, and/or any other suitable forces to hold the connector housing. In some examples, the housing retainer may be sized and shaped to accept a wide variety of different types of housing retainers having different shapes and sizes, without requiring significant retooling or reconfiguration of the housing retainer.

The connector housing may be inserted into the housing inspection system in any suitable way. In some examples, a human operator loads the connector housing into the housing inspection system prior to insertion of cable wires into the connector housing, and then removes the connector housing from the inspection system once cable insertion has completed. In some examples, insertion and/or removal of the connector housing may be performed by a suitable automated system—e.g., a suitable automated machine or robot.

Similarly, while the connector housing is held in place by the housing retainer, cable wires may be inserted into the connector housing in any suitable way. For instance, cable wires may be manually inserted by a human operator. Additionally, or alternatively, cable wires may be automatically inserted by a suitable automated system.

Figure 3A:
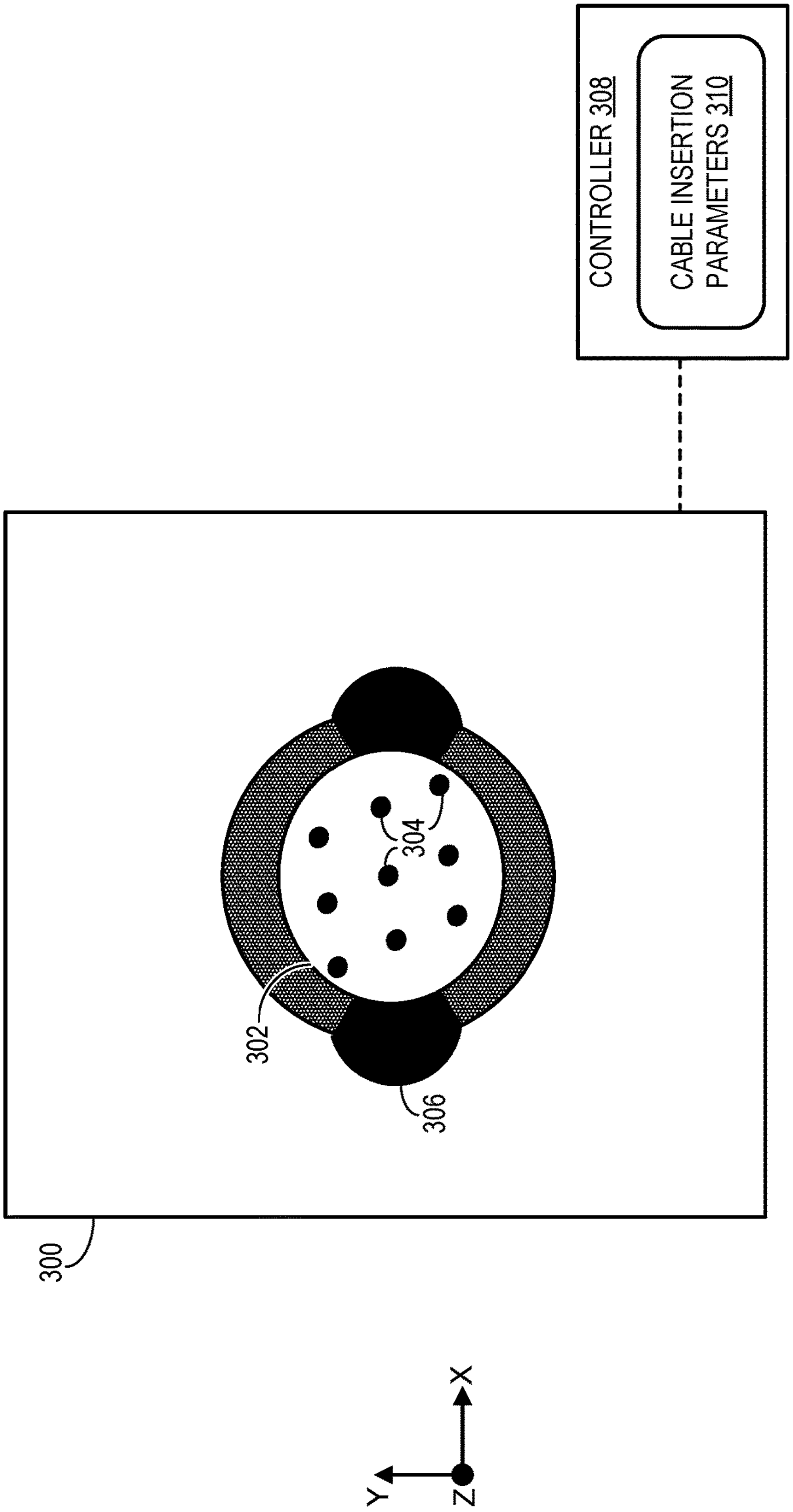
FIG. 3A schematically depicts an example connector housing held in a housing retainer of a housing inspection system.

In the example of FIG. 3A, housing inspection system 300 is communicatively coupled with a controller 308. The "controller" takes the form of any suitable computer logic hardware configured to execute software, firmware, and/or hardware-encoded instructions to thereby control operations of the housing inspection system. For example, as will be described in more detail below, the controller may be used to control operation of a camera system, and/or implement machine vision systems used for connector housing recognition and cable wire insertion verification. In cases where automated systems are used for insertion of the connector housing into the housing inspection system, and/or insertion of cable wires into the connector housing, such automated systems may be controlled by controller 308.

In this example, the controller is depicted as being separate from the housing inspection system. For instance, the controller may be at least partially integrated into a structure that is physically separate from the housing inspection system, and may be communicatively coupled with the housing inspection system via any suitable wired or wireless connection. However, it will be understood that in some examples, the controller may be "on-board" the housing inspection system-integrated into the same physical assembly as the housing inspection system. In some examples, controller 308 performs one or more steps of method 200. In some examples, controller 308 is implemented as computing system 800 described below with respect to FIG. 8.

In some cases, prior to insertion of cable wires into the connector housing, the housing inspection system receives a set of cable insertion parameters including information pertinent to the cable wire insertion process. In the example of FIG. 3A, controller 308 has received a set of cable insertion parameters 310. In general, these include any information pertinent to the subsequent cable insertion process, in which cable wires are inserted into cable cavities of the connector housing.

For instance, in some cases, the cable insertion parameters specify the intended type of connector housing that should be inserted into the housing inspection system for the current assembly process. Once a connector housing is inserted, the housing inspection system may perform connector housing recognition to confirm that the connector housing is the correct type. Additionally, or alternatively, the cable insertion parameters may specify a correct insertion sequence in which one or more cable wires are inserted into the one or more cable cavities of the connector housing. This may include an order in which the cable cavities are to be filled (e.g., based on different identifiers assigned to the cable cavities), an order in which different cable wires are to be inserted (e.g., based on different identifiers assigned to the cable wires), a mapping of different specific cable wires to different cable cavities, and/or any other suitable information. It will be understood that the cable insertion parameters may include any suitable information pertinent to cable wire insertion into the connector housing.

The cable insertion parameters may be provided in any suitable way. In some examples, the cable insertion parameters are provided by a human user, such as an operator or overseer of the housing inspection system. For instance, the human user may specify the cable insertion parameters by providing input to a suitable input mechanism, such as a computer mouse, keyboard, and/or touch-sensitive display interface. Additionally, or alternatively, the cable insertion parameters may be retrieved from computer storage. For instance, the cable insertion parameters may be stored in local data storage hardware of the housing inspection system, loaded from a removable storage device, and/or accessed via a computer network.

In some examples, aspects of the cable insertion parameters may be displayed for viewing. For instance, the cable insertion parameters may include a set of instructions to a human user for inserting cable wires in the correct sequence. In some examples, the displayed instructions are updated in real time—e.g., to provide feedback to the user as to whether the correct cable wire was inserted on the last insertion step.

Figure 3B:
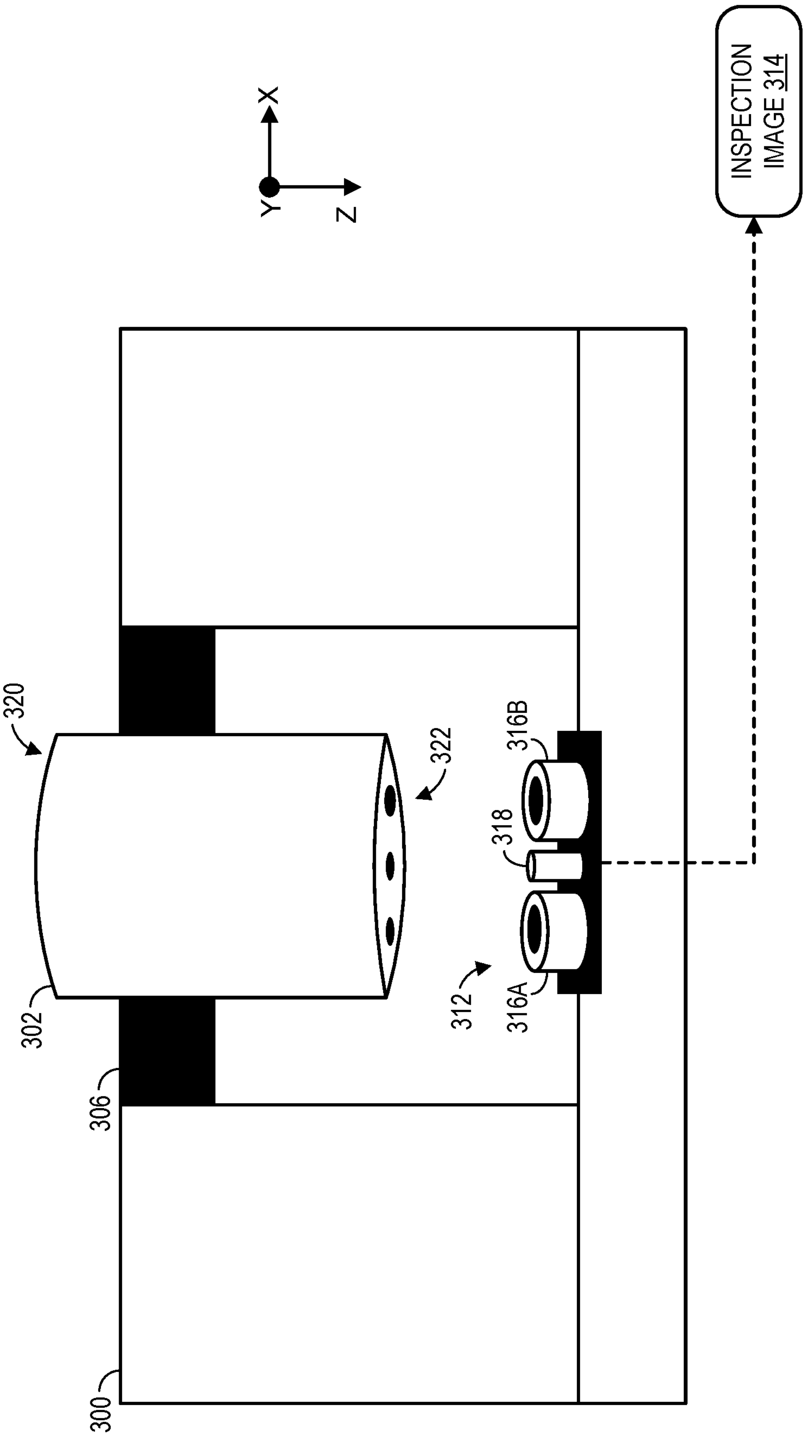
FIG. 3B schematically depicts use of a camera system of a housing inspection system to capture an inspection image of a connector housing.

FIG. 3B schematically provides a different view of the connector housing held by the housing retainer of the housing inspection system. In FIG. 3B, portions of the housing inspection system are omitted to provide a top-down view (e.g., looking along the Y axis as labeled in FIGS. 3A and 3B) of connector housing 302 held by housing retainer 306 within the housing inspection system 300. From this perspective, it can be observed that the housing inspection system includes a camera system 312. The camera system is configured to capture an inspection image 314 of the connector housing, as will be described in more detail below.

In the example of FIG. 3B, camera system 312 is a stereo camera system that includes a first camera 316A and a second camera 316B. Each of these cameras may capture their own respective inspection images of the connector housing, and either or both of these inspection images may be used for connector housing recognition and cable wire insertion verification. In general, however, the camera system includes any suitable number and type of different cameras for capturing insertion images. For instance, in some examples, the camera system may include only a single camera. In some examples, the camera system may include three or more cameras. In general, increasing the number of cameras can improve the accuracy of the connector recognition and insertion verification processes, while increasing the complexity and expense of the housing inspection system. In other words, the housing inspection system includes a camera system of one or more suitable cameras, where each camera may be sensitive to any suitable wavelengths of electromagnetic radiation, and have any suitable image-capture capabilities, including resolution, frame rate, and/or field-of-view.

As one example, the camera system includes one or more greyscale or RGB cameras, which are sensitive to visible wavelengths of light and output greyscale or RGB images. In some examples, the camera system includes one or more depth cameras in addition to, or instead of, visible light cameras and/or other suitable cameras. Depth cameras are configured to output depth images, where pixels of the depth images encode the detected distances between the image sensor of the depth camera and physical objects in the surrounding environment. Any suitable depth-sensing technology may be used—e.g., stereoscopic, structured light, or time-of-flight.

In examples where both visible-light and depth cameras are used, they may in some cases be used together as an integrated camera module. As one non-limiting example, an Intel® RealSense™ camera system may be used, which includes both RGB and depth camera modules together in a known alignment, and outputs both RGB and depth image data.

In the example of FIG. 3B, the housing inspection system additionally includes a lighting system 318. The lighting system is configured to emit illumination light toward the connector housing. This may serve to provide relatively uniform lighting conditions while inspection images of the connector housing are captured. The lighting system may take any suitable form and use any suitable hardware components for producing illumination light. The illumination light may have any suitable intensity and may use any suitable wavelengths of electromagnetic radiation.

Illumination light may be emitted at any suitable time. For instance, in some cases, illumination light may be provided whenever the housing inspection system is powered on. In some cases, illumination light may be selectively toggled on and off. For instance, illumination light may only be emitted when a connector housing is held in the housing retainer, or may only be emitted immediately prior to capture of inspection images (e.g., the illumination light may serve as a camera flash).

In the example of FIG. 3B, the camera system is attached to the housing inspection system at a fixed position relative to the housing retainer. This may beneficially improve the consistency of the inspection images captured by the camera system. For instance, because the position of the camera system is fixed relative to the housing retainer, different connector housings held in the housing retainer may be imaged from approximately the same distance for each inspection image. In some cases, the housing retainer and/or connector housing are designed such that, while the connector housing is held in the housing retainer, the connector housing is positioned at a known fixed distance away from the camera system. For example, the housing retainer may be designed to fit within a notch or groove of the connector housing. In some cases, while the connector housing is loaded into the housing retainer, it is inserted such that a feature or marker on the connector housing aligns with a feature or marker on the housing retainer, indicating that the connector housing is properly positioned with respect to the camera system.

As shown, in this example, the connector housing has two different faces on opposite sides of the connector housing (relative to the Z axis as labelled in FIGS. 3A and 3B). This includes an insertion face into which cable wires are inserted, and an observation face that faces the camera system. In FIG. 3B, connector housing 302 includes an insertion face 320 and an observation face 322. The cable cavities of the connector housing extend from the insertion face of the connector housing to the observation face of the connector housing. Furthermore, the inspection image captured by the camera system depicts the observation face. In this manner, as cable wires are inserted into the connector housing, the tips of the cable wires may become visible in inspection images captured by the camera system. This can be used to automatically verify correct cable wire insertion, as will be described in more detail below.

Figure 3C:
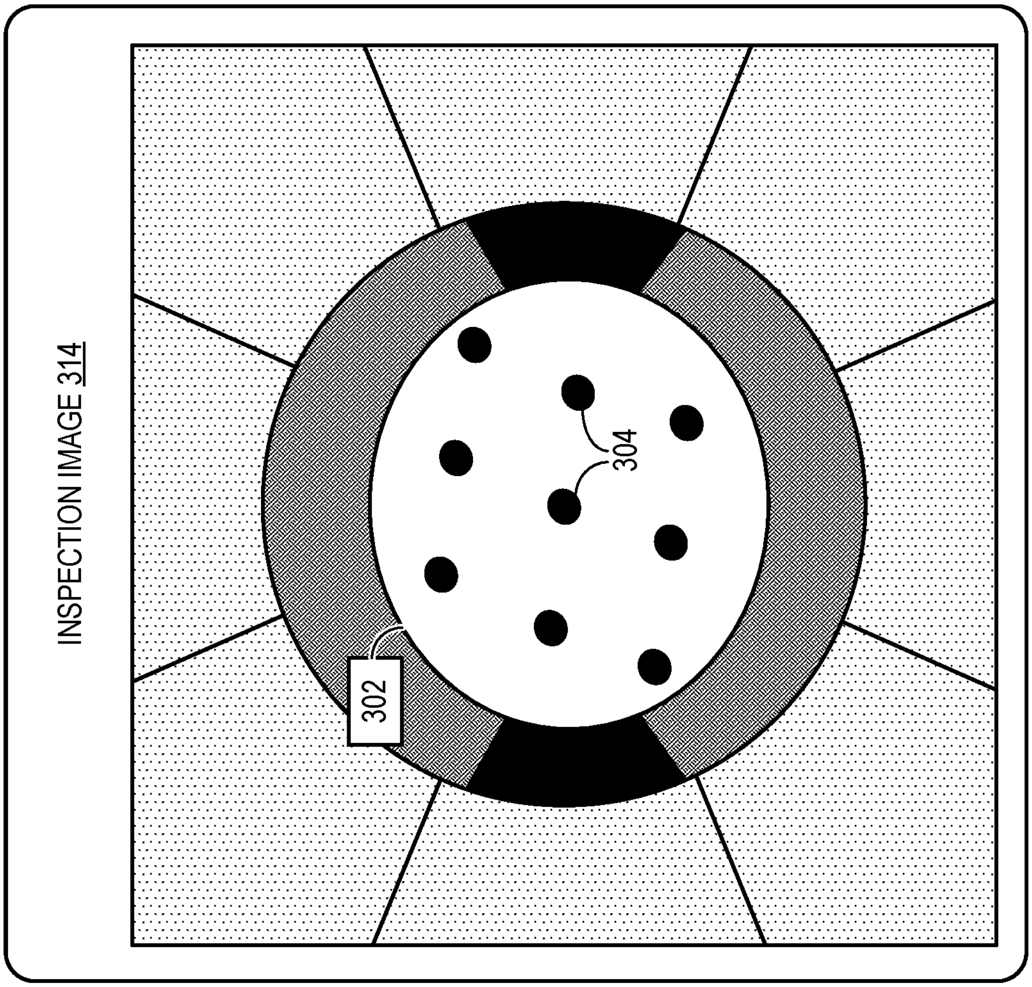
FIG. 3C schematically depicts an example inspection image captured by a camera system.

FIG. 3C includes a schematic representation of an example inspection image 314 captured of connector housing 302 by camera system 312. As discussed above, inspection image 314 depicts the observation face of the connector housing, which is opposite from the insertion face into which cable wires are inserted. In this example, the cable cavities extend from the insertion face, through the connector housing, to the observation face. Thus, any cable wires inserted into the connector housing may be visible in inspection images captured of the observation face.

It will be understood that the images described herein need not be visually rendered or displayed for viewing by a human user. While one example inspection image is shown in FIG. 3C, this is only done for the sake of illustration. Rather, in some examples, the images are captured and stored by the housing inspection system for processing as digital data structures that are never visually represented on a computer display, or otherwise presented for viewing.

Returning briefly to FIG. 2, at 204, method 200 includes classifying the connector housing as a recognized connector housing type using a connector recognition machine vision system. This may be done based, at least in part, on a comparison between the inspection image of the connector housing and a template image corresponding to the recognized connector housing type.

Figure 4:
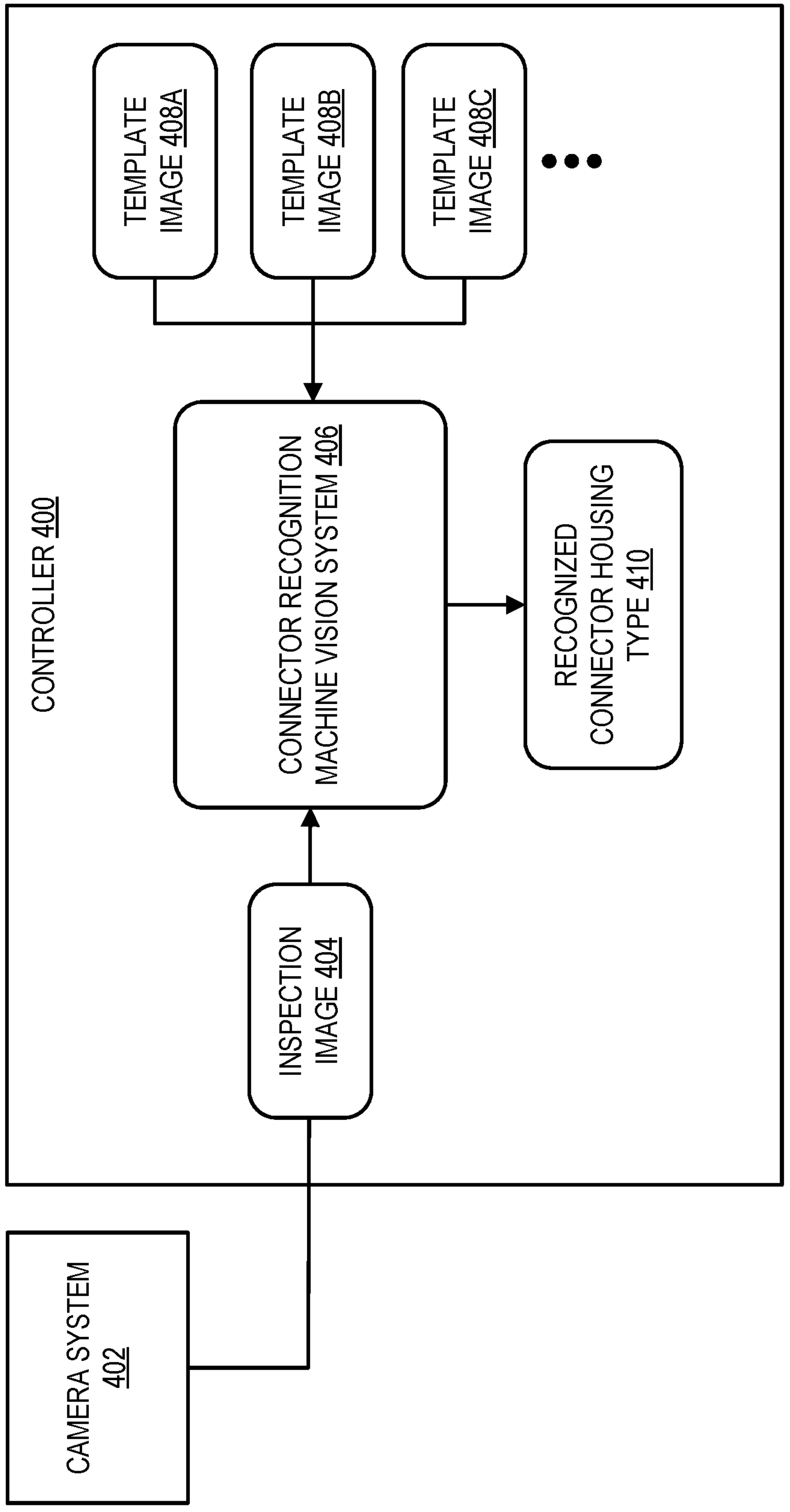
FIG. 4 schematically illustrates recognizing a recognized connector housing type based on an inspection image.

This process is schematically illustrated with respect to FIG. 4, showing an example controller 400. As with controller 308 of FIG. 3A, controller 400 may be implemented as any suitable computer logic device. In some examples, controller 400 is implemented as computing system 800 described below with respect to FIG. 8. In FIG. 4, controller 400 is communicatively coupled with a camera system 402 of a housing inspection system. From camera system 402, controller 400 receives an inspection image 404 depicting a connector housing held in a housing retainer, such as inspection image 314 of FIG. 3C. The inspection image is input to a connector recognition machine vision system 406, which is configured to classify the connector housing in the inspection image as a recognized connector housing type.

The connector recognition machine vision system is implemented in any suitable way. In some examples, the connector recognition machine vision system includes one or more suitable artificial intelligence (AI) and/or machine learning (ML) models configured to classify input images. As one non-limiting example, the computer recognition machine vision may be trained on a plurality of different template images corresponding to a plurality of different connector housing types. This is schematically illustrated in FIG. 4, where the connector recognition machine is trained on a plurality of different template images, including template images 408A-C. Based on the inspection image 404, obtained from camera system 402, and the template images 408A-C, the connector recognition machine vision system 406 outputs a recognized connector housing type 410—e.g., classifying the connector housing depicted in the inspection image as one of the connector housing types represented in the template images.

Any suitable ML and/or AI techniques may be used to implement the connector recognition machine vision system. In some cases, the connector recognition machine vision system includes a support vector machine, which may be used to generate different classification models corresponding to different recognized connector housing types. Additionally, or alternatively, the connector recognition machine vision system may include an artificial neural network—e.g., the connector recognition machine vision may include one of a support vector machine or an artificial neural network. In cases where a stereo camera system is used to capture inspection images of the connector housing (such as is shown in FIG. 3B), the connector recognition machine vision system may in some cases include a first recognition model trained to classify inspection images output by a first camera of the stereo camera system, and a second recognition model trained to classify inspection images output by the second camera of the stereo camera system. Thus, in one non-limiting approach, training the connector recognition machine vision system may include placing a connector housing in the housing inspection system, then capturing one or more images for that connector housing (referred to as "template" images). This may be repeated for each connector housing type. These template images may then be loaded into a database, where image classification models are generated (e.g., using support vector machines or artificial neural networks) to generate a separate and unique image signature for each connector type. In some examples, "template images" can include three-dimensional models or scans in addition to, or instead of, two-dimensional images of a connector housing.

In any case, the connector recognition machine vision system is configured to output a recognized connector housing type based, at least in part, on the inspection image. In some examples, the classification of the connector housing includes confirming that the correct type of connector housing was inserted into the housing inspection system. For examples, in some cases, the "correct" type of connector housing is already known—e.g., it may be specified in the cable insertion parameters as discussed above with respect to FIG. 3A. Thus, classifying the connector housing may serve to confirm that the correct type of housing was inserted. In some cases, the housing inspection system may output an error if an incorrect connector housing type is detected. This may, for instance, catch scenarios where a human operator mistakenly loads the wrong type of connector housing into the housing inspection system.

Alternatively, in some examples, the connector housing is classified substantially blindly—e.g., with no prior knowledge of the type of connector housing that is "correct" for the current type of cable connector under construction. In one example scenario, a user may load a suitable connector housing into the housing inspection system, which may then classify the connector housing as a recognized connector housing type. From there, the system may automatically retrieve a correct insertion sequence and set of insertion instructions for the recognized connector housing type, which the user may then follow while inserting cable wires into the connector housing.

The output of the connector recognition machine vision system may take any suitable form. As one non-limiting example, the inspection image may be provided to different classification models corresponding to the different recognized connector housing types, which each then output prediction scores indicating that model's confidence that the inspection image corresponds to that model's connector housing type. These prediction scores may then be aggregated and compared to a classification threshold. If a most-likely prediction score exceeds the classification threshold, the machine vision system classifies the connector housing as belonging to the connector housing type corresponding to the most-likely prediction score. If none of the prediction scores exceed the classification threshold, then the machine vision system may output a classification error. The classification threshold may have any suitable value depending on the implementation—e.g., it may be set by a user or operator to balance the risk of false classifications against the risk of classification errors.

Once the connector housing is classified, the housing inspection system may in some cases perform cavity detection to identify the locations of the cable cavities of the connector housing. In some examples, detecting the positions of the cable cavities may include detecting correspondences between image features in the inspection image and image features in the template image. For instance, once a template image for a particular connector housing type is captured, the positions of the cable cavities within the template image may be manually labeled by a human user, and/or automatically detected via a suitable computer vision system (e.g., a suitable ML and/or AI model). Thus, by detecting correspondences between the inspection image and the template image, positions of the cable cavities within the inspection image may be detected.

Figure 5:
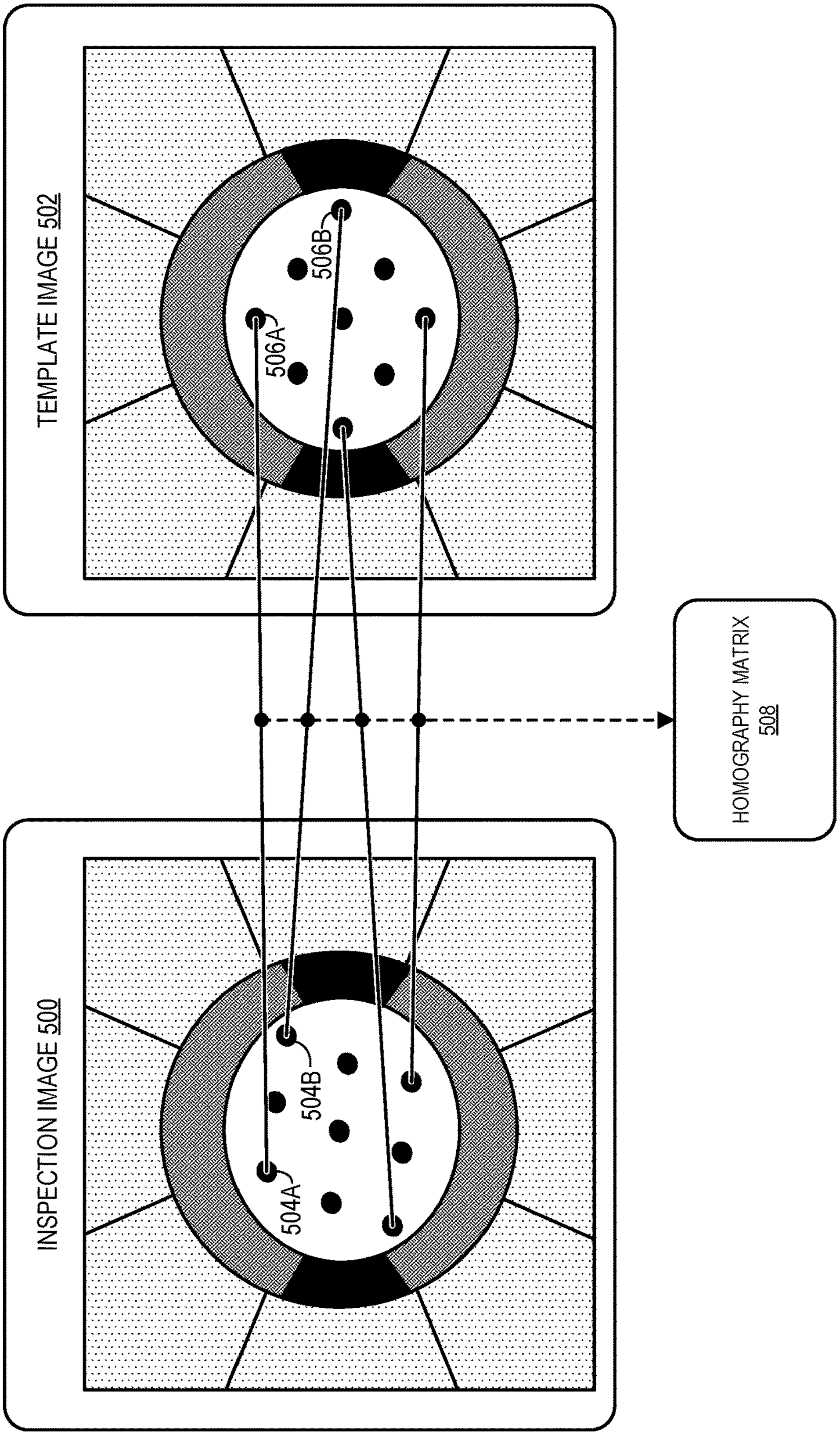
FIG. 5 schematically illustrates identifying correspondences between image features in an inspection image and a template image.

This is schematically illustrated with respect to FIG. 5, including an example inspection image 500 depicting a connector housing held in a housing inspection system. Inspection image 500 is compared to a template image 502, which depicts the same type of connector housing as the inspection image. In FIG. 5, image features 504A and 504B of inspection image 500 correspond to image features 506A and 506B of template image 502.

Any suitable approach may be used to detect such image feature correspondences. In some cases, suitable feature recognition algorithms, such as SIFT (Scale-Invariant Feature Transform) and/or FLANN (Fast Library for Approximate Nearest Neighbors) may be used to identify correspondences between image features in two different images. In one example approach, SIFT may initially be applied to both images to detect keypoints and compute their descriptors. SIFT keypoints are points in the image that are invariant to scale and rotation, and each keypoint has an associated descriptor. These descriptors effectively capture the local gradient information around the keypoint, making them distinct and robust to changes in viewpoint and illumination.

Once the SIFT descriptors are obtained from both images, FLANN may be used to match the corresponding descriptors between the two images. FLANN is an algorithm for efficiently finding approximate nearest neighbors in high-dimensional spaces. It speeds up the search for the closest match of each descriptor in one image to the descriptors in the other image. In this process, each descriptor in the first image is compared with all descriptors in the second image to find the best matches. The FLANN algorithm efficiently searches for the nearest neighbors (i.e., the most similar descriptors) in this high-dimensional space. Usually, the nearest neighbor is identified as the best match, but sometimes the second-nearest neighbor is also considered to ensure the match's uniqueness and to filter out false matches. The output of this process is a set of pairs of keypoints, where each pair consists of a keypoint from the first image and its corresponding keypoint in the second image. For instance, these keypoints may represent matching cable cavities between the two images.

In some examples, detecting correspondences between the cable cavities in the inspection image and the template image includes generating a homography matrix to account for a rotation of the positions of the one or more cable cavities caused by rotation of the connector housing in the inspection image relative to the template image. This is schematically illustrated with respect to FIG. 5, where a homography matrix 508 is generated to account for a rotation of the connector housing between the template and inspection images.

In general, the homography matrix may be generated in any suitable way. In cases where SIFT is used, because SIFT descriptors are rotation invariant, the matched keypoints will inherently account for any rotation of the connector housing between the two images. This means that even if the connector housing is rotated in one image relative to the other, the SIFT algorithm will still be able to find corresponding keypoints. With the matched keypoints, a homography matrix may be estimated that describes how points in one image get transformed to points in another image under planar perspective transformations. This includes translation, rotation, scale, and perspective distortions. The goal is to solve for a homography matrix H that satisfies the equation $p'=Hp$, where p and p' are corresponding points in the two images. This may be done using a method like Direct Linear Transformation (DLT) or using an algorithm like Random Sample Consensus (RANSAC) to robustly handle outliers. The result is a homography matrix that, when applied to the points in one image, maps them to their corresponding points in the other image. This matrix accounts for all the planar transformations, including any rotation that occurred between the two views of the object.

Returning briefly to FIG. 2, at 206, method 200 includes, for one or more cable cavities of the connector housing, automatically verifying whether a correct cable wire is inserted into the cable cavity according to the recognized connector housing type. In general, a set of cable wires may be inserted into the one or more cable cavities over a series of one or more cable insertion steps of an insertion sequence. After each insertion step, and/or after completion of the entire insertion sequence, images captured by the camera sequence may be used to verify whether the cable wires were correctly inserted—e.g., the correct cable wires were inserted into the correct corresponding cable cavities. In other words, in some examples, the housing inspection system may verify, after each insertion step, whether a last-inserted cable wire is inserted into a correct cable cavity of the one or more cable cavities. Additionally, or alternatively, each cable wire may be verified at once after the completion of the entire insertion sequence.

Figure 6:
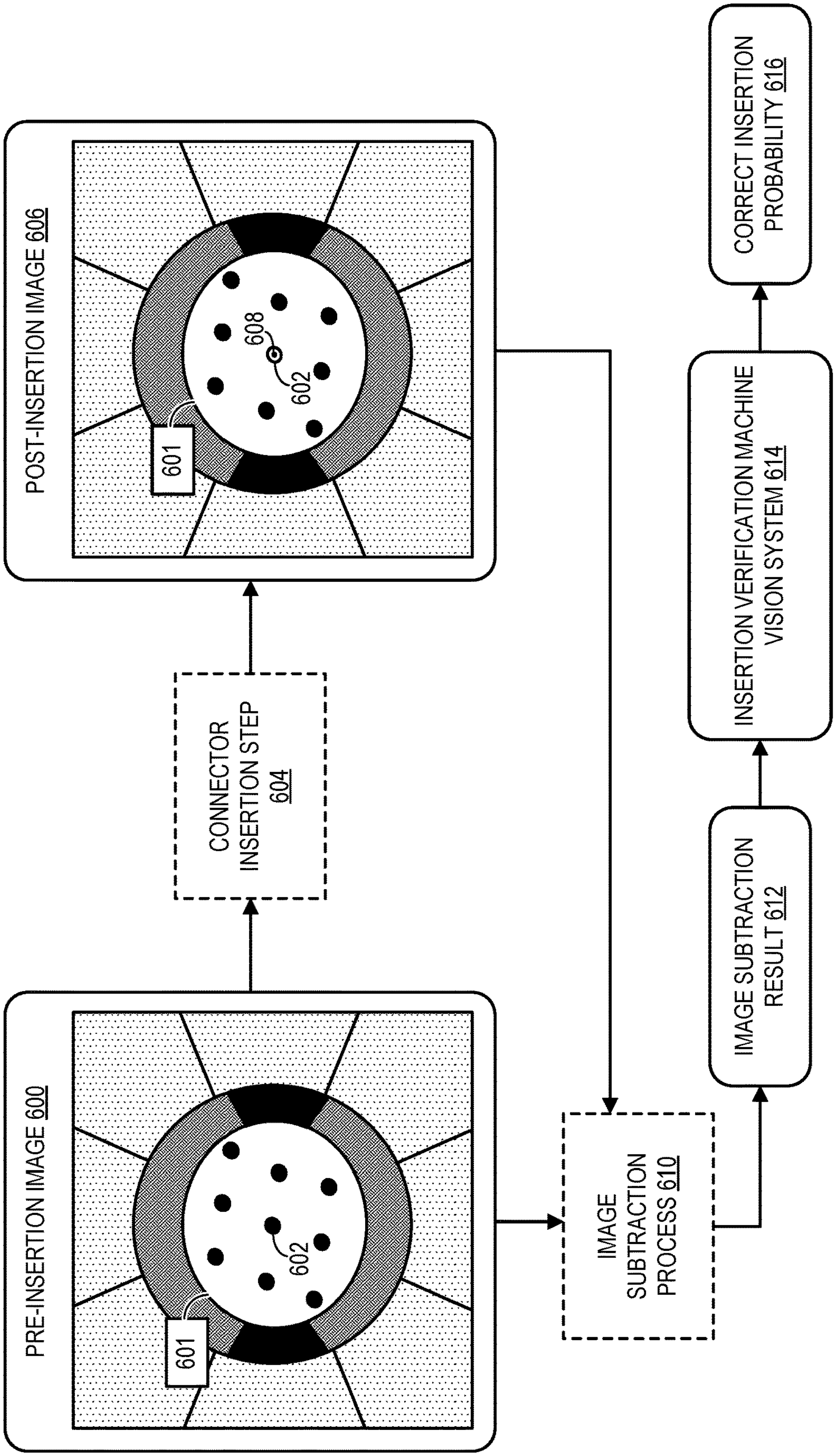
FIG. 6 schematically illustrates cable wire insertion verification.

One example approach to cable wire insertion verification is schematically illustrated with respect to FIG. 6. FIG. 6 depicts an example image 600 of a connector housing 601. Connector housing 601 includes a plurality of cable cavities, one of which is labeled as cable cavity 602. In this example, all of the cable cavities of connector housing 601 are currently empty, although this need not always be the case. Rather, the approach illustrated with respect to FIG. 6 may be performed any time the connector housing includes at least one cable cavity that is still vacant. Image 600 is referred to as a "pre-insertion image" as it is captured prior to a connector insertion step 604 of a cable insertion sequence.

After connector insertion step 604, the camera system is used to capture a post insertion image 606, again depicting connector housing 601. In this case, however, a cable wire 608 has been inserted into cable cavity 602, which is partially visible in post-insertion image 606. In this example approach, both the pre-insertion image 600 and the post-insertion image 606 are input to an image subtraction process 610, which subtracts pixel values of the post-insertion image from pixel values of the pre-insertion image (or vice versa). Because the only change between the two images was insertion of a cable wire, many pixel values of the image subtraction result 612 will be at or near zero. The image subtraction result will therefore have the effect of highlighting any change in appearance of the connector housing between capture of the two images—e.g., pixels depicting cable wire 608 inserted into cable cavity 602. In other words, the housing inspection system generates an image subtraction result based on the pre-insertion image and the post-insertion image, which can be used to detect movement (e.g., insertion of a cable wire) between the two images.

In the approach of FIG. 6, the image subtraction result 612 is provided to an insertion verification machine vision system 614, which is trained to output a correct insertion probability 616 based on the image subtraction result. In some cases, upon detecting movement in the image subtraction result (e.g., a region of pixels having pixel values higher than a movement threshold), a region-of-interest centered on the detected movement is input to the insertion verification machine vision system 614. If the correct insertion probability 616 exceeds a verification threshold, the housing inspection system may verify that the correct cable wire is inserted. If the correct insertion probability 616 does not exceed the verification threshold, then the housing inspection system may output an error stating that an incorrect insertion may have occurred. This may, for instance, prompt a human operator to remove the last-inserted cable wire and try again. It will be understood that the probability threshold may have any suitable value depending on the implementation—e.g., to balance the risk of false error notifications vs undetected insertion errors. In some cases, this process may be performed for each image captured by the camera system—e.g., in cases where the camera system is a stereo camera system that captures two different images at once, then each of these images may be used as the basis for performing cable wire insertion verification.

The insertion verification machine vision system may take any suitable form and may be trained in any suitable way. In one example approach, training the insertion verification machine vision system may include first capturing one or more images of an empty connector housing (e.g., "empty images"). Next, after the cable cavities of the connector housing have been filled with the correct corresponding cable wires, additional images of the connector housing may be captured (e.g., "filled images"). These empty and filled reference images may then be used to train a classification algorithm, which can be used at inference to verify whether cable wires are correctly inserted into a connector housing. Similar to the connector recognition machine vision system, any suitable ML and/or AI techniques may be used. As one non-limiting example, the insertion verification machine learning system may use a support vector machine.

In some cases, insertion of a "correct" cable wire may include a determination that the correct cable cavity was filled according to the insertion sequence. In other words, in some cases, the system does not distinguish between different specific cable wires, but rather assumes that if a cable wire is inserted into the next cable cavity in the insertion sequence, then the sequence is being followed correctly. Alternatively, in some cases, the different cable wires have sufficiently different appearances (e.g., sizes, colors, contact types) that cable wire insertion verification may include determining that the correct individual cable wire was inserted into the correct corresponding cable cavity in the connector housing.

In any case, the process illustrated in FIG. 6 may be repeated any suitable number of times during an overall insertion sequence, where one or more different cable wires are inserted into cable cavities of a connector housing. As discussed above, insertion verification in some cases takes place after each insertion step of the insertion sequence. In other examples, insertion verification may only take place after the entire insertion sequence has been completed—e.g., every cable wire has been inserted.

Figure 7:
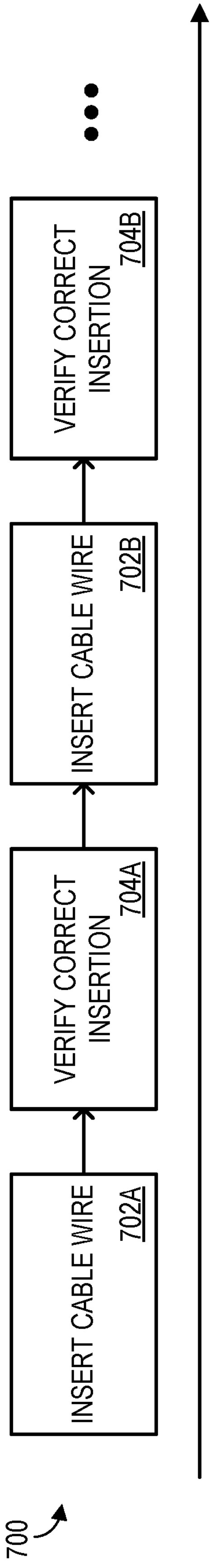
FIG. 7 schematically illustrates steps in an example insertion sequence.

FIG. 7 schematically illustrates one example insertion sequence 700. As shown, in this example, the insertion sequence includes multiple steps 702A and 702B, where different cable wires are inserted into the connector housing. In FIG. 7, after each insertion step, the housing inspection system performs an insertion verification step 704A/704B to determine if the last insertion step was correct—e.g., the correct cable wire is inserted into the correct corresponding cable cavity. The insertion sequence 700 may continue for any suitable number of subsequent steps, depending on the number of cable cavities in the connector housing, and the number of cable wires to be inserted.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 8:
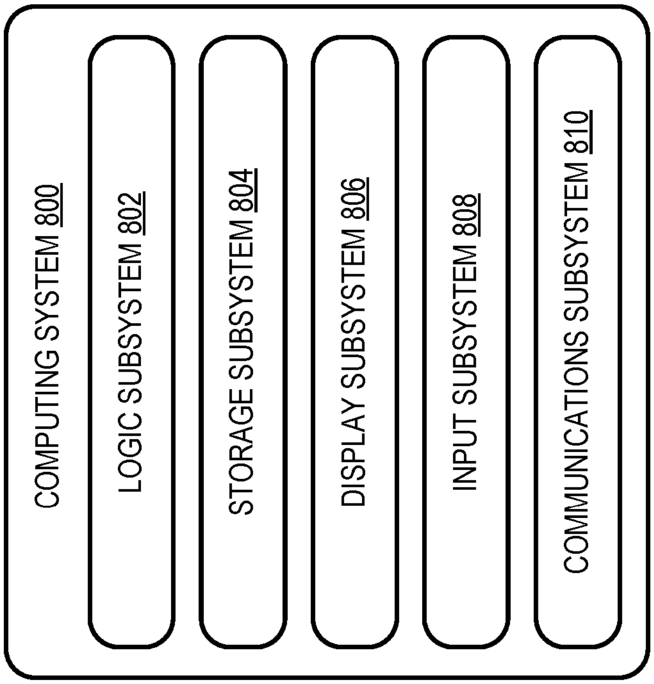
FIG. 8 schematically shows an example computing system.

FIG. 8 schematically shows a simplified representation of a computing system 800 configured to provide any to all of the compute functionality described herein. Computing system 800 may take the form of one or more network-accessible devices, personal computers, server computers, mobile computing devices, and/or other computing devices.

Computing system 800 includes a logic subsystem 802 and a storage subsystem 804. Computing system 800 may optionally include a display subsystem 806, input subsystem 808, communication subsystem 810, and/or other subsystems not shown in FIG. 8.

Logic subsystem 802 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 804 includes one or more physical devices configured to temporarily and/or permanently hold computer information, such as data and instructions executable by the logic subsystem. When the storage subsystem includes two or more devices, the devices may be collocated and/or remotely located. Storage subsystem 804 may include volatile, nonvolatile, dynamic, static, read/write, read-only, random-access, sequential-access, location-addressable, file-addressable, and/or content-addressable devices. Storage subsystem 804 may include removable and/or built-in devices. When the logic subsystem executes instructions, the state of storage subsystem 804 may be transformed—e.g., to hold different data.

Aspects of logic subsystem 802 and storage subsystem 804 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 806 may be used to present a visual representation of data held by storage subsystem 804. This visual representation may take the form of a graphical user interface (GUI). Display subsystem 806 may include one or more display devices utilizing virtually any type of technology. In some implementations, display subsystem may include one or more virtual-, augmented-, or mixed reality displays.

When included, input subsystem 808 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 810 may be configured to communicatively couple computing system 800 with one or more other computing devices. Communication subsystem 810 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a method for cable wire insertion verification comprises: receiving, from a camera system, an inspection image of a connector housing held in a housing retainer of a housing inspection system; via a connector recognition machine vision system, classifying the connector housing as a recognized connector housing type based, at least in part, on a comparison between the inspection image of the connector housing and a template image corresponding to the recognized connector housing type; and for one or more cable cavities of the connector housing, automatically verifying whether a correct cable wire is inserted into the cable cavity according to the recognized connector housing type. In this example or any other example, the connector recognition machine vision system is trained on a plurality of different template images corresponding to a plurality of different connector housing types. In this example or any other example, the connector recognition machine vision system includes one of a support vector machine or an artificial neural network. In this example or any other example, the camera system is a stereo camera system including a first camera and a second camera, and wherein the connector recognition machine vision system includes a first recognition model trained to classify inspection images output by the first camera and a second recognition model trained to classify inspection images output by the second camera. In this example or any other example, the camera system is attached to the housing inspection system at a fixed position relative to the housing retainer. In this example or any other example, the one or more cable cavities of the connector housing extend from an insertion face of the connector housing to an observation face of the connector housing, and wherein the inspection image of the connector housing depicts the observation face. In this example or any other example, the housing inspection system further includes a lighting system configured to emit illumination light toward the observation face of the connector housing. In this example or any other example, the method further comprises detecting positions of the one or more cable cavities in the inspection image by detecting correspondences between image features in the inspection image and image features in the template image. In this example or any other example, the method further comprises generating a homography matrix to account for a rotation of the positions of the one or more cable cavities caused by rotation of the connector housing relative to the template image. In this example or any other example, a set of cable wires are inserted into the one or more cable cavities over a series of one or more cable insertion steps of an insertion sequence, and wherein, after each insertion step, the method further comprises automatically verifying whether a last-inserted cable wire is inserted into a correct cable cavity of the one or more cable cavities. In this example or any other example, the method further comprises capturing a pre-insertion image prior to each insertion step, capturing a post-insertion image after each insertion step, and generating an image subtraction result based on the pre-insertion image and the post-insertion image. In this example or any other example, the image subtraction result is provided to an insertion verification machine vision system trained to output a correct insertion probability based on the image subtraction result. In this example or any other example, the method further comprises, prior to cable wire insertion, receiving cable insertion parameters specifying a correct insertion sequence in which one or more cable wires are inserted into the one or more cable cavities of the connector housing.

In an example, a housing inspection system comprises: a controller configured to: receive, from a camera system, an inspection image of a connector housing held in a housing retainer of the housing inspection system; via a connector recognition machine vision system, classify the connector housing as a recognized connector housing type based, at least in part, on a comparison between the inspection image of the connector housing and a template image corresponding to the recognized connector housing type; and for one or more cable cavities of the connector housing, automatically verify whether a correct cable wire is inserted into the cable cavity according to the recognized connector housing type. In this example or any other example, the connector recognition machine vision system is trained on a plurality of different template images corresponding to a plurality of different connector housing types. In this example or any other example, the camera system is a stereo camera system including a first camera and a second camera, and wherein the connector recognition machine vision system includes a first recognition model trained to classify inspection images output by the first camera and a second recognition model trained to classify inspection images output by the second camera. In this example or any other example, the controller is further configured to detect positions of the one or more cable cavities in the inspection image by detecting correspondences between image features in the inspection image and image features in the template image. In this example or any other example, the controller is further configured to generate a homography matrix to account for a rotation of the positions of the one or more cable cavities caused by rotation of the connector housing relative to the template image. In this example or any other example, a set of cable wires are inserted into the one or more cable cavities over a series of one or more cable insertion steps of an insertion sequence, and wherein, after each insertion step, the controller is further configured to automatically verify whether a last-inserted cable wire is inserted into a correct cable cavity of the one or more cable cavities.

In an example, a method for cable wire insertion verification comprises: receiving, from a camera system, an inspection image of a connector housing held in a housing retainer of a housing inspection system, wherein the camera system is attached to the housing inspection system at a fixed position relative to the housing retainer; via a connector recognition machine vision system, classifying the connector housing as a recognized connector housing type based, at least in part, on a comparison between the inspection image of the connector housing and a template image corresponding to the recognized connector housing type by identifying correspondences between detected cable cavities in the inspection image and cable cavities in the template image; and after each insertion step of a series of insertion steps of an insertion sequence, automatically verifying whether a correct cable wire is inserted into a cable cavity of the connector housing according to the recognized connector housing type.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for cable wire insertion verification, the method comprising:

receiving, from a camera system, an inspection image of a connector housing held in a housing retainer of a housing inspection system;

via a connector recognition machine vision system, classifying the connector housing as a recognized connector housing type based, at least in part, on a comparison between the inspection image of the connector housing and a template image corresponding to the recognized connector housing type;

capturing a pre-insertion image of the connector housing prior to a cable insertion step in which a cable wire is inserted into a cable cavity of one or more cable cavities of the connector housing;

capturing a post-insertion image of the connector housing after the cable insertion step; and automatically verifying whether a correct cable wire is inserted into the cable cavity according to the recognized connector housing type and an image subtraction result generated based on the pre-insertion image and the post-insertion image.

2. The method of claim 1, wherein the connector recognition machine vision system is trained on a plurality of different template images corresponding to a plurality of different connector housing types.

3. The method of claim 2, wherein the connector recognition machine vision system includes one of a support vector machine or an artificial neural network.

4. The method of claim 1, wherein the camera system is a stereo camera system including a first camera and a second camera, and wherein the connector recognition machine vision system includes a first recognition model trained to classify inspection images output by the first camera and a second recognition model trained to classify inspection images output by the second camera.

5. The method of claim 1, wherein the camera system is attached to the housing inspection system at a fixed position relative to the housing retainer.

6. The method of claim 1, wherein the one or more cable cavities of the connector housing extend from an insertion face of the connector housing to an observation face of the connector housing, and wherein the inspection image of the connector housing depicts the observation face.

7. The method of claim 1, further comprising detecting positions of the one or more cable cavities in the inspection image by detecting correspondences between image features in the inspection image and image features in the template image.

8. The method of claim 7, further comprising generating a homography matrix to account for a rotation of the positions of the one or more cable cavities caused by rotation of the connector housing relative to the template image.

9. The method of claim 1, wherein the one or more cable cavities include two or more cable cavities, wherein the cable wire is one of a set of two or more cable wires that are inserted into the two or more cable cavities over a series of two or more cable insertion steps of an insertion sequence, and wherein, after each cable insertion step, the method further comprises automatically verifying whether a last-inserted cable wire is inserted into a correct cable cavity of the two or more cable cavities.

10. The method of claim 9, wherein, for each cable insertion step of the insertion sequence, a corresponding pre-insertion image is captured prior to the cable insertion step, a corresponding post-insertion image is captured after the cable insertion step, and a corresponding image subtraction result is generated for the cable insertion step based on the corresponding pre-insertion image and the corresponding post-insertion image.

11. The method of claim 10, wherein the corresponding image subtraction result for each cable insertion step of the insertion sequence is provided to an insertion verification machine vision system trained to output a correct insertion probability for the cable insertion step.

12. The method of claim 10, wherein for at least one cable wire of the set of two or more cable wires, the corresponding pre-insertion image is the inspection image of the connector housing, and wherein for one or more additional cable wires of the set of two or more cable wires, the corresponding pre-insertion image is captured after a preceding cable insertion step.

13. The method of claim 1, further comprising, prior to cable wire insertion, receiving cable insertion parameters specifying a correct insertion sequence in which one or more cable wires are inserted into the one or more cable cavities of the connector housing.

14. A housing inspection system, comprising:

a controller configured to:

receive, from a camera system, an inspection image of a connector housing held in a housing retainer of the housing inspection system;

via a connector recognition machine vision system, classify the connector housing as a recognized connector housing type based, at least in part, on a comparison between the inspection image of the connector housing and a template image corresponding to the recognized connector housing type;

capture a pre-insertion image of the connector housing prior to a cable insertion step in which a cable wire is inserted into a cable cavity of one or more cable cavities of the connector housing;

capture a post-insertion image of the connector housing after the cable insertion step; and automatically verify whether a correct cable wire is inserted into the cable cavity according to the recognized connector housing type and an image subtraction result generated based on the pre-insertion image and the post-insertion image.

15. The housing inspection system of claim 14, wherein the connector recognition machine vision system is trained on a plurality of different template images corresponding to a plurality of different connector housing types.

16. The housing inspection system of claim 14, wherein the camera system is a stereo camera system including a first camera and a second camera, and wherein the connector recognition machine vision system includes a first recognition model trained to classify inspection images output by the first camera and a second recognition model trained to classify inspection images output by the second camera.

17. The housing inspection system of claim 14, wherein the controller is further configured to detect positions of the one or more cable cavities in the inspection image by detecting correspondences between image features in the inspection image and image features in the template image.

18. The housing inspection system of claim 17, wherein the controller is further configured to generate a homography matrix to account for a rotation of the positions of the one or more cable cavities caused by rotation of the connector housing relative to the template image.

19. The housing inspection system of claim 14, wherein the one or more cable cavities include two or more cable cavities, wherein the cable wire is one of a set of two or more cable wires that are inserted into the two or more cable cavities over a series of two or more cable insertion steps of an insertion sequence, and wherein, after each cable insertion step, the controller is further configured to automatically verify whether a last-inserted cable wire is inserted into a correct cable cavity of the two or more cable cavities.

20. A method for cable wire insertion verification, the method comprising:

receiving, from a camera system, an inspection image of a connector housing held in a housing retainer of a housing inspection system, wherein the camera system is attached to the housing inspection system at a fixed position relative to the housing retainer;

via a connector recognition machine vision system, classifying the connector housing as a recognized connector housing type based, at least in part, on a comparison between the inspection image of the connector housing and a template image corresponding to the recognized connector housing type by identifying correspondences between detected cable cavities in the inspection image and cable cavities in the template image; and after each insertion step of a series of insertion steps of an insertion sequence, automatically verifying whether a correct cable wire is inserted into a cable cavity of the connector housing according to the recognized connector housing type and an image subtraction result, wherein the image subtraction result is generated by, prior to each insertion step, capturing a pre-insertion image of the connector housing, after each insertion step, capturing a post-insertion image of the connector housing, and generating the image subtraction result based on the pre-insertion image and the post-insertion image.

* * * * *